United States Patent
Baude et al.

(10) Patent No.: US 8,595,238 B2
(45) Date of Patent: Nov. 26, 2013

(54) SMART INDEX CREATION AND RECONCILIATION IN AN INTERCONNECTED NETWORK OF SYSTEMS

(75) Inventors: Brent Joseph Baude, Rochester, MN (US); Gregory Scott Hurlebaus, Rochester, MN (US); Jaroslaw Miszczyk, Rochester, MN (US); Gottfried Schimunek, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 13/166,523

(22) Filed: Jun. 22, 2011

(65) Prior Publication Data

US 2012/0330964 A1 Dec. 27, 2012

(51) Int. Cl.
  *G06F 17/30* (2006.01)
(52) U.S. Cl.
  USPC ......................................................... 707/741
(58) Field of Classification Search
  USPC ......................................................... 707/741
  See application file for complete search history.

(56) References Cited

U.S. PATENT DOCUMENTS

| | | |
|---|---|---|
| 2003/0177124 A1 | 9/2003 | Sauri |
| 2005/0086192 A1 | 4/2005 | Kodama |
| 2005/0086195 A1* | 4/2005 | Tan et al. ......................... 707/1 |
| 2005/0125427 A1* | 6/2005 | Dageville et al. ............. 707/100 |
| 2005/0203940 A1* | 9/2005 | Farrar et al. .................. 707/102 |
| 2006/0106792 A1 | 5/2006 | Patterson |
| 2011/0060745 A1 | 3/2011 | Hoffman |

* cited by examiner

*Primary Examiner* — Baoquoc N To
(74) *Attorney, Agent, or Firm* — Arnold B. Bangali; Jason H. Sosa; Libby Z. Toub

(57) ABSTRACT

A tool for using an interconnected network of systems to create an index for a database table. An index advisor on a primary server recommends one or more indexes to improve efficiency. While resources of the primary server are being used by various queries and processes, the primary server sends the recommendations to a secondary server (with available resources) so that the recommended indexes may be built in parallel with the processes executing on the primary server. The secondary server builds the recommended indexes based on its own copies of the database tables. The secondary server sends the built indexes to the primary server, where the primary server must reconcile the indexes with any changes that took place to the database tables subsequent to the replication of the tables on the secondary server. The primary server makes the associations between the new indexes and the tables they were built for.

21 Claims, 5 Drawing Sheets

SMART INDEX CREATION AND RECONCILIATION IN AN INTERCONNECTED NETWORK OF SYSTEMS

TECHNICAL FIELD

This disclosure relates generally to database management and more specifically to index creation and management for databases in an interconnected network of systems.

BACKGROUND OF THE INVENTION

A database is an integrated collection of data records, files, and other database objects needed by an application. Database objects are stored in database tables that are accessible to a user. A database index is a data structure that improves the speed of data retrieval operations on a database table. A database management system (DBMS) is the software that controls the creation, maintenance, and use of a database. The DBMS handles user queries for data.

Indexes are important for query performance because a good set of indexes can provide more efficient access to tables and speed up query processing. Indexes can improve performance by providing local filtering, making join processing more efficient, avoiding the need for sort processing, providing index-only access, enforcing referential integrity, and more. Consequently, indexing is a fundamental part of query tuning.

Clustered computing systems and associated components are a group of systems that work together and are often interconnected through a local area network (LAN). One example of such a cluster is a data center where servers and storage systems are stored in close proximity. Data centers tend to stress data security and largely focus on redundancy. This includes redundancy of processes, redundancy of data, redundant power supplies, and redundant data communications connections. In this manner, the probability of losing high value data, and access to that data, is minimized. Towards that end, data centers typically have a primary server, controlling access to the data center components, and at least one secondary server with a copy of the DBMS software.

An optimizer functionality (sometimes referred to as a query optimizer or database optimizer) is one function of the DBMS which determines the best way to execute a query received from a client. The optimizer examines possible paths through, for example, an index scan, and determines an optimal query plan, also referred to as an access plan, for the query received. The query plan is an ordered set of steps used to access or modify information in the DBMS.

Growing complexity of queries means that determining the correct indexes to create can be a challenging and difficult task. An index advisor is a functionality running as a part, or in conjunction with, the DBMS and provides detailed recommendations for indexes to create, based upon performance signatures of the database workload. When the resources are available, the recommended indexes are created and attached to the corresponding database tables.

Though client demand for availability of operation of a data center is constant, there are fluctuations in that demand throughout the day. For example, one or more clients may need to perform critical business operations at the close of the business day—and together, these operations demand a large amount of data center resources in a short amount of time. As these operations are performed, the index advisor may determine that new indexes should be created to enhance the efficiency of the operations. However, the subsequent index creation is a resource intensive task. When resources are already in high demand, building the more efficient indexes may decrease, or even negate, the sought after efficiency that comes with their creation.

SUMMARY

Aspects of the present invention disclose a method, computer system, and computer program product for forming an index to access data in a table of a database. A first server computer determines access performance and workload of at least some of the database, and in response, determines a recommendation for the index to increase performance of access to data in the table. The first server computer sends the recommendation for the index to a second server computer. The first server computer receives the index from the second server computer; the index is based on the recommendation and a replication of the table on the second server computer. The first server computer modifies the index based on changes to the table made after the replication of the table. The first server computer subsequently uses the index to access data in the table.

DETAILED DESCRIPTION

Figure 1:
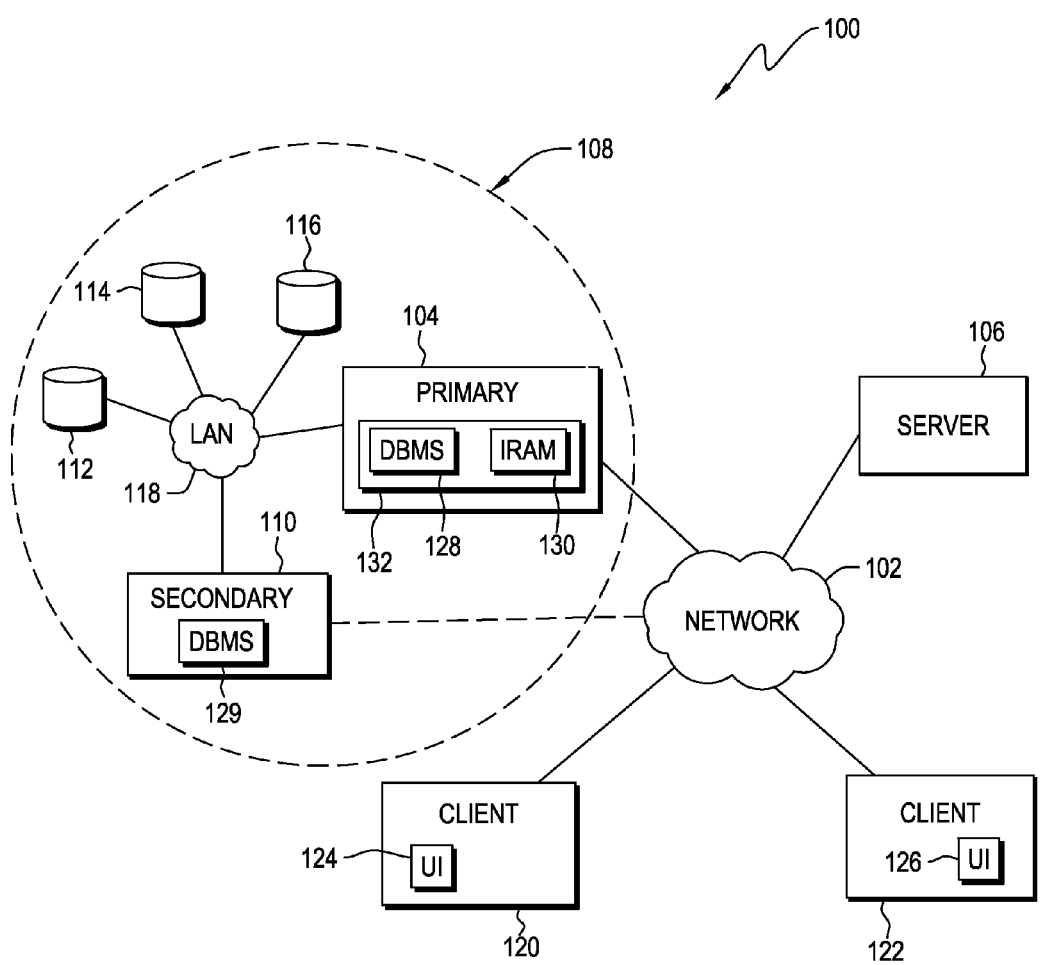
FIG. 1 depicts an illustrative diagram of a data processing environment as a network of data processing systems in which illustrative embodiments may be implemented.

FIG. 1 depicts an illustrative diagram of a data processing environment as a network of data processing systems in which illustrative embodiments may be implemented. It should be appreciated that FIG. 1 provides only an illustration of one implementation and does not imply any limitations with regard to the environments in which different embodiments may be implemented. Many modifications to the depicted environments may be made.

Network data processing system 100 comprises a network of computers in which an embodiment may be implemented. Network data processing system 100 contains network 102, which acts as a medium for providing communications links between various devices and computers connected together within network data processing system 100. Network 102 may include connections, such as wire, wireless communication links, or fiber optic cables.

In the depicted example, primary server computer 104 and server computer 106 connect to network 102. Server computers 104 and 106 may be, for example, server computer systems such as a management server, a web server, or any other electronic device or computing system capable of receiving and sending data. In the depicted embodiment, primary server computer 104 is a primary server for computing system 108 utilizing clustered computers and components to act as a single pool of seamless resources when accessed through network 102. This is a common implementation for data centers and cloud computing applications. Secondary server computer 110 is a secondary computer in computing system 108 and may optionally connect to network 102 as an alternate path should primary server computer 104 fail. Other components of computing system 108 include storage units 112, 114, and 116. Storage units 112, 114, and 116 may store one or more databases for one or more users/clients. All the components of computing system 108, including primary server computer 104, secondary server computer 110, and storage units 112, 114, and 116 are interconnected through LAN 118. In other embodiments, other devices may be connected to LAN 118.

Client computers 120 and 122 connect to network 102. Client computers 120 and 122 are examples of clients to computing system 108, and may be, for example, a client computer system such as a notebook, a laptop computer, a tablet computer, a handheld device or smart-phone, a thin client, or any other electronic device or computing system capable of communicating with a server computer system through a network. In the depicted example, primary server computer 104 provides access to one or more databases, on at least one of storage units 112, 114, and 116, to client computers 120 and 122. Client computers 120 and 122 may contain user interfaces (UI) 124 and 126, respectively. UIs 124 and 126 may process and display data received from primary server computer 104, and may accept instructions from a user for manipulating data stored in storage units 112, 114, and 116 of computing system 108. UIs 124 and 126 may be, for example, a graphical user interface (GUI) or a web user interface (WUI). Network data processing system 100 may include additional server computers, client computers, displays and other devices not shown.

In one embodiment, database management system (DBMS) 128 runs on primary server computer 104 to handle queries and control access, creation, maintenance, and the use of databases on storage units 112, 114, and 116. A copy of DBMS 128, DBMS 129, runs on secondary server computer 110. DBMS 128 has the added functionality to send recommended indexes to another computer so that the recommended indexes may be built in parallel with DBMS 128 operations. In the preferred embodiment, the other computer that builds the recommended indexes is secondary server computer 110. In another embodiment, the other computer may be server computer 106. DBMS 128 can receive the built index(es) and incorporate them to improve its operations.

Index reconciliation and attachment module (IRAM) 130 is a functionality that, in one embodiment, executes on primary server computer 104 and reconciles a received built index with the current state of a data table that the index corresponds to. After reconciliation, IRAM 130 attaches the index to the data table. In one embodiment, IRAM 130 is a functionality of DBMS 128. In another embodiment, IRAM 130 is a separate functionality running in parallel to the operations of DBMS 128.

Together, DBMS 128 and IRAM 130 may comprise the instructions for smart index creator 132, which provides the functionality to create indexes by taking advantage of the resources of a plurality of computers. In another embodiment, smart index creator 132 also includes instructions (i.e., the "build" instructions) executed on another computer system, such as secondary server computer 110.

DBMS 129 on secondary server computer 110 is preferably an exact duplicate of DBMS 128 on primary server computer 104. Due to the fact that secondary server computer 110 may be programmed to take over operations if primary server computer 104 were to fail, in one embodiment, secondary server computer maintains copies of all programs running on primary server computer 104, including IRAM 130 and smart index creator 132. In this manner, secondary server computer 110 may also create recommendations for indexes and have the recommendations, in turn, built on a separate computer system.

At a minimum, however, primary server computer 104 executes programs to determine recommendations for indexes, send the recommendations to another server, receive the built indexes from the other server, and reconcile the built indexes with a current state of the database tables. Secondary server computer 110 executes programs to receive recommendations for indexes, to build indexes based on the recommendations and database tables stored locally, and to send the built indexes to the computer that sent the recommendations.

Figure 5:
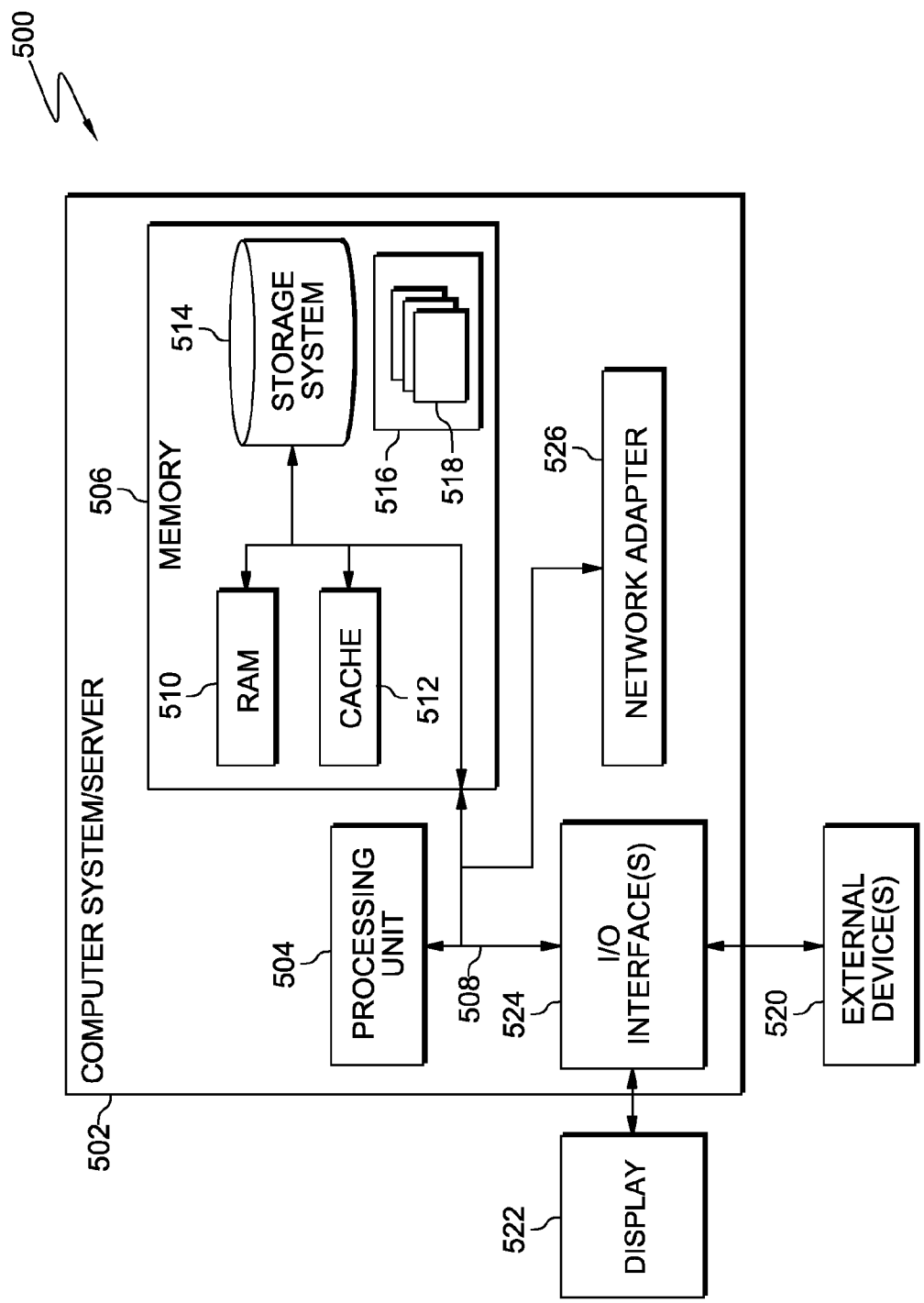
FIG. 5 depicts a block diagram of components of a data processing system depicted in accordance with an illustrative embodiment.

Server computers 104, 106, and 110, and client computers 120 and 122, each maintain respective system components. Exemplary components of the servers and clients are illustrated in FIG. 5.

In the depicted example, network data processing system 100 is the Internet with network 102 representing a worldwide collection of networks and gateways that use the Transmission Control Protocol/Internet Protocol suite of protocols to communicate with one another. Network data processing system 100 may also be implemented as a number of different types of networks, such as an intranet, a local area network (LAN), or a wide area network (WAN). FIG. 1 is intended as an example, and not as an architectural limitation for the different embodiments.

Figure 2:
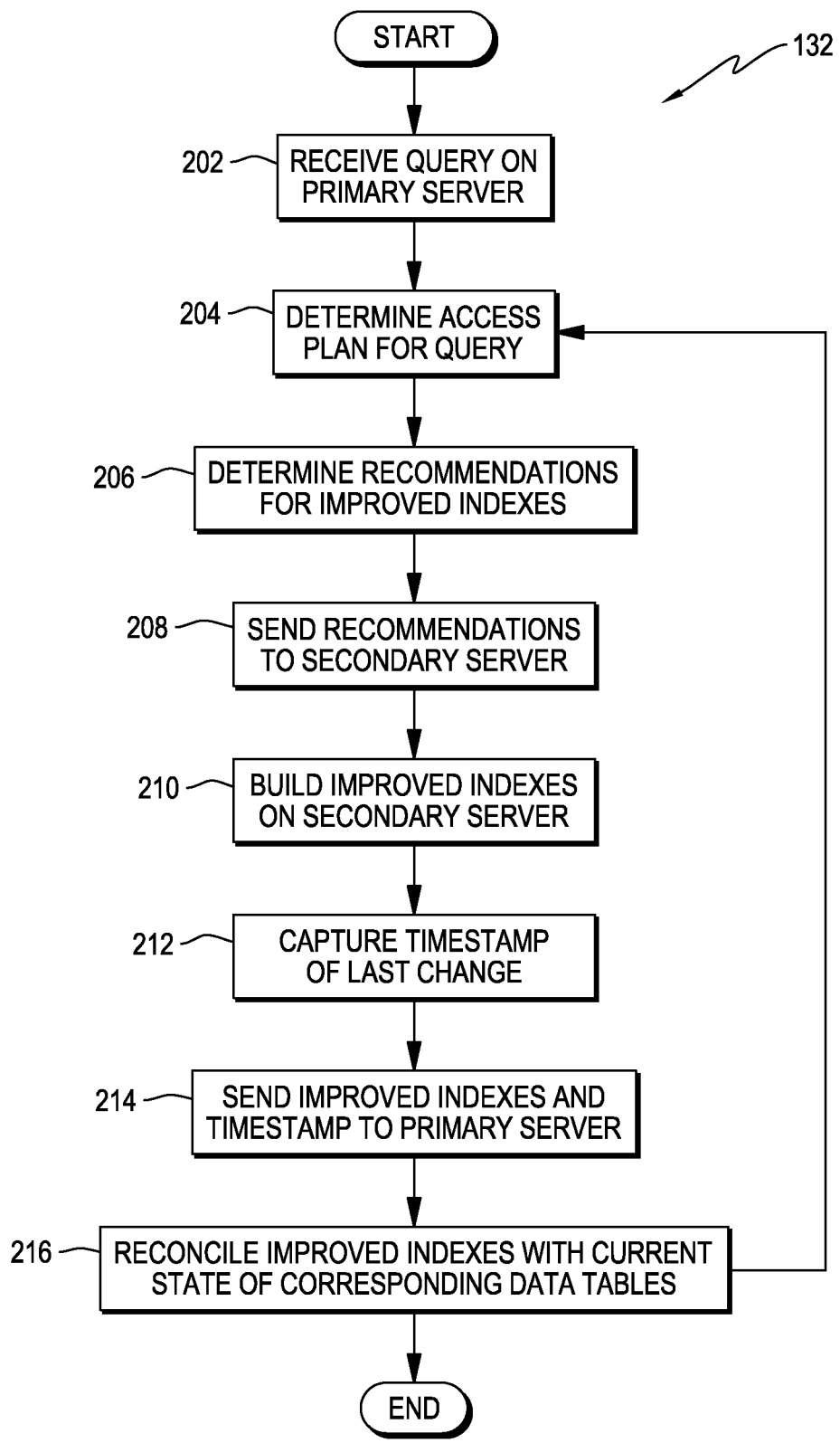
FIG. 2 illustrates the steps of a flowchart for a smart index creation program in accordance with an embodiment of the present invention

FIG. 2 illustrates the steps of a flowchart for smart index creator 132, in accordance with an embodiment of the present invention.

Smart index creator 132 receives a database query at a primary server (step 202). The primary server can be any computer responsible for managing and accessing a database. The database could be stored locally on the primary server, or in a preferred embodiment, the database is stored on one or more connected storage devices. The one or more storage devices may be connected directly to the primary server, or alternatively, may be connected through a network, such as a LAN or a WAN. Exemplary storage devices include IBM® System Storage DS8000® systems.

Smart index creator 132 determines an access plan (or query plan) for the received query (step 204). The access plan is the ordered set of steps used to access or modify information in the database. Smart index creator 132 parses the received query and uses an optimizing functionality (query optimizer) to determine the best possible plan. More specifically, the optimizing functionality of smart index creator 132 determines a set of access plans by examining the possible access paths (e.g., index scan, sequential scan) and join algorithms (e.g., sort-merge join, hash join, nested loop join). Subsequent to determining the set of access plans, the optimizing functionality determines which plan is the most efficient. This is often a cost-based calculation, where costs estimate the runtime cost of evaluating the query, in terms of the number of input/output (I/O) operations required, the CPU requirements, and other factors determined from the data dictionary. The data dictionary is a centralized repository of information about data such as meaning, relationships to other data, origin, usage, and format.

Smart index creator 132 determines recommendations for new and/or improved indexes (step 206). In one embodiment, as access plans are being determined, smart index creator 132 reviews the access plans and presents opportunities (or recommendations) for new indexes or changes to existing indexes. For example, smart index creator 132 may analyze the row selection in the query and determine, based on default values, if creation of a permanent index improves performance. If smart index creator 132 determines that a new index might be beneficial, it returns the key columns necessary to create the suggested index. In other embodiments, when making the determination, join, ordering, and grouping criteria may be considered in addition to selection criteria. The portion of smart index creator 132 that makes index recommendations is often referred to as the index advisor.

Smart index creator 132 sends the recommendations to the secondary server (step 208). For example, if as a result of determining that a new index would be beneficial smart index creator 132 returned the key columns necessary to create the index, the key columns would be sent to the secondary server. In another embodiment, smart index creator 132 only sends the recommendations to the secondary server in response to determining that the primary server does not have enough available resources to create the indexes locally in an efficient manner. In another embodiment still, smart index creator 132 sends the recommendations to the secondary server at predefined 'peak' times.

As the name implies, the secondary server acts as a backup to the primary server. Many data centers have at least one secondary server. While typically the primary server and the secondary server are in close proximity (often connected through a LAN), the secondary server could be located anywhere so long as the capability to connect to the primary server exists and the secondary server maintains necessary duplicate information.

For example, the secondary server keeps a copy of the database tables on the primary server. However, this is an asynchronous data replication process. Though the secondary server is typically continually updated by the primary server, there exists a latency period where after the update has occurred, a short time will pass before the primary server can update the secondary server again. Changes to data on the primary server during this period, will not be replicated on the secondary server for the remainder of the period. Therefore, it is often the case that the data present on the secondary server, such as database tables, is an older version, containing some differences, of the data present on the primary server. The latency period is typically anywhere from a few seconds to a few minutes. Depending on the computer systems in use and their localities, this period may be shorter or longer than the typical period.

In one embodiment, smart index creator 132 builds the recommended indexes on the secondary server (step 210) based on the received information (the recommendations) from the primary server. In another embodiment, smart index creator 132 may send the recommended indexes to a separate functionality (or agent) executing on the secondary server and the separate functionality builds the indexes. The functionality for creating an index based on a recommendation for an index is known in the art. For example the SQL CREATE INDEX command could build the requested index(es). In other embodiments, advanced techniques such as CPU and I/O parallelism could be used to increase the speed of the index creation process. However, the recommendations received are applicable for the database tables on the primary server. Smart index creator 132 applies these recommendations to the database tables on the secondary server, which tend to contain some variations as discussed previously, to create the recommended indexes.

Smart index creator 132 captures the timestamp of the last change to database tables on the secondary server (step 212).

Whenever a change occurs to a database table, a database log associated with the table is updated. A typical database log comprises a timestamp of the change, the row number of the change, and a row image. When a database table is replicated from the primary server to the secondary server, the database log is also replicated onto the secondary server. Smart index creator 132 retrieves the last applied entry timestamp from the replicated database log. Because a database table on the secondary server is a copy of a database table on the primary server, the retrieved timestamp from the database log reflects the time when the change occurred according to the clock on the primary server.

Smart index creator 132 sends the indexes created on the secondary server and the captured timestamp to the primary server (step 214). The indexes are for use by the optimization functionality. However, because the indexes were potentially created for an older version of the database tables, the indexes must be reconciled with the current state of the database tables (step 216). Smart index creator 132 compares the received captured timestamp to timestamps on the current database log of the primary server to make this reconciliation. The preferred implementation of step 216 is discussed in FIG. 3.

In one embodiment, upon reconciliation in step 216, smart index creator 132 executes the optimizing functions immediately (see step 204) so that the improved index(es) can be included in the access plan determinations. In another embodiment, smart index creator 132 ends, and any new indexes are found at the next full open.

Figure 3:
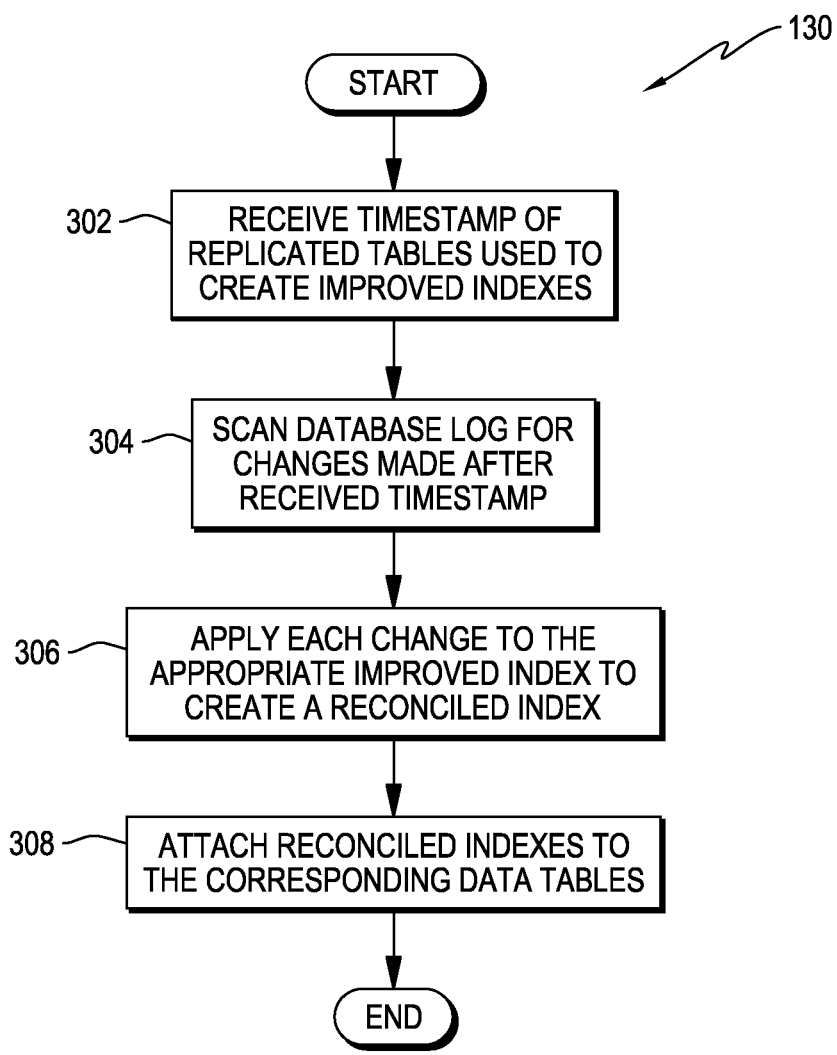
FIG. 3 depicts the steps of a flowchart for an index reconciliation and attachment module (IRAM) as an exemplary implementation of one step from the flowchart of FIG. 2.

FIG. 3 depicts the steps of a flowchart for the index reconciliation and attachment module (IRAM) 130. IRAM 130 is an exemplary implementation of step 216 from smart index creator 132.

IRAM 130 receives the timestamp of the last registered change in the replicated tables that were used to create the new indexes (step 302). Subsequently, IRAM 130 scans the database log on the primary server for changes made after the received timestamp (step 304).

Because there are typically only minimal changes taking place, in a preferred embodiment, IRAM 130 begins at the bottom row of the database log (i.e., the last recorded change) of the appropriate table on the primary server. If the timestamp does not match, IRAM 130 moves to the next lowest row. When the timestamp matches the received timestamp, IRAM 130 has found where the data tables diverge and may use all previously checked rows to determine the changes not accounted for in the received index.

IRAM 130 applies each change discovered to the appropriate received index to create a reconciled index (step 306). As any differences are typically minimal, these few updates to the received index require a fraction of the resources needed to create the indexes.

IRAM 130 attaches each reconciled index to its corresponding data table (step 308). Now when indexes are scanned, it is the reconciled indexes that may be found and used to determine efficient access plans.

Figure 4:
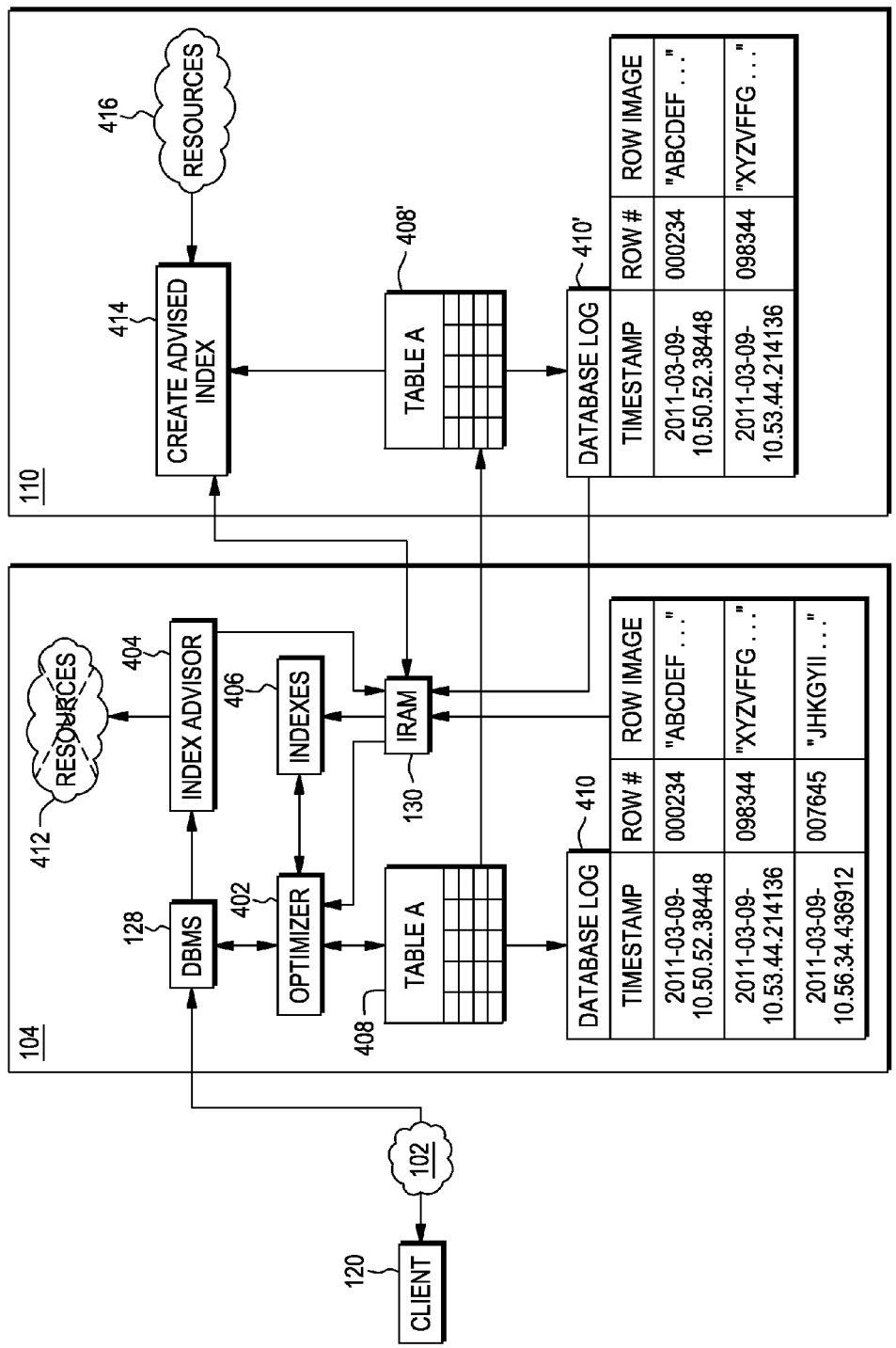
FIG. 4 is a diagram illustrating an exemplary data flow between interconnected systems.

FIG. 4 is a diagram illustrating an exemplary data flow between interconnected systems. Client computer 120 communicates with primary server computer 104 through network 102. Primary server computer 104 communicates in turn with secondary server computer 110.

DBMS 128 receives a query from client computer 120. DBMS 128 passes the query to optimizer 402. The execution of DBMS 128 also triggers index advisor 404 to analyze performance and database workload to recommend indexes that might increase speed and efficiency of a query plan.

Optimizer 402 determines an efficient query plan. Optimizer 402 accomplishes this, in part, by scanning through indexes 406 to determine the most efficient plan. Optimizer 402 uses a determined index to access a desired database table, such as table 408. In response to any change taking place to table 408, database log 410 is updated to reflect the time and location of the change.

Table 408 is replicated from primary server computer 104 to secondary server computer 110 to create table 408'. This replication process occurs frequently. Table 408' has an association with database log 410', which is a replication of database log 410 at the time table 408 was replicated. As can be seen by database log 410 when compared to database log 410', in the depicted example table 408 has been updated subsequent to the replication that created table 408'.

Meanwhile, index advisor 404 determines a new index that might improve efficiency and recommends the new index. Prior to building the new index, index advisor 404, in one embodiment, checks the availability of resources 412 on primary server computer 104. Upon finding that resources 412 are unavailable, index advisor 404 notifies IRAM 130 to send the recommended index to create advised index program 414 on secondary server computer 110. In another embodiment index advisor 404 may send the recommended index to create advised index program 414 directly.

Create advised index program 414 uses the local copy of the table for which the index is to be built, in this case table 408', and uses the processing resources 416 of secondary server computer 110. In this manner, the recommended index may be built in parallel to the processing occurring on primary server computer 104.

Create advised index program 414 sends the created index back to IRAM 130 on primary server computer 104.

In addition to the created index, IRAM 130 receives the timestamp of the most recent change from database log 410'. This timestamp represents the most recent change to the database table that the created index has considered. IRAM 130 then receives every entry in database log 410 created after the timestamp from database log 410', and adds the changes to the created index. The reconciled index is then attached to the table 408.

By attaching the reconciled index to table 408, the reconciled index is included in indexes 406 to be considered the next time optimizer 402 scans indexes 406. IRAM 130 may also trigger optimizer 402 to determine the optimal query plan upon attaching the reconciled index to table 408, so that the reconciled index is considered by optimizer 402 right away. In another embodiment, IRAM 130 may not contain the functionality to trigger optimizer 402, and optimizer 402 executes in its standard sequence.

FIG. 5 depicts a block diagram of components of a data processing system in accordance with an illustrative embodiment. Data processing system 500 represents systems of components for server computers 104, 106 and 110, and client computers 120 and 122.

Computer system 502 is an embodiment of data processing system 500. Computer system 502 is only one example of a suitable computer system and is not intended to suggest any limitation as to the scope of use or functionality of embodiments of the invention described herein. Regardless, computer system 502 is capable of being implemented and/or performing any of the functionality set forth hereinabove.

Examples of well-known computing systems, environments, and/or configurations that may be suitable for use with computer system 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 502 may be described in the general context of computer system-executable instructions, such as program modules, being executed by a computer system. Generally, program modules may include routines, programs, objects, components, logic, data structures, and so on that perform particular tasks or implement particular abstract data types. Computer system 502 may be practiced in distributed cloud computing environments where tasks are performed by remote processing devices that are linked through a communications network. In a distributed cloud computing environment, program modules may be located in both local and remote computer system storage media including memory storage devices. Additionally, program modules on local storage media of computer system 502 may be distributed through a network to a separate computer system for use in computer-readable storage media of the separate computer system.

Computer system 502 is shown in the form of a general purpose computing device. The components of computer system 502 may include, but are not limited to, one or more processors or processing units 504, a system memory 506, and a bus 508 that couples various system components including system memory 506 to processor 504.

Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 502 typically includes a variety of computer-readable tangible storage media. Such media may be any available storage device that is accessible by computer system 502, and it includes both volatile and non-volatile media, and removable and non-removable storage devices.

System memory 506 can include computer-readable storage media in the form of volatile memory, such as random access memory (RAM) 510 and/or cache memory 512. Computer system 502 may further include other removable/non-removable, volatile/non-volatile computer-readable storage media. By way of example only, storage system 514 can be provided for reading from and writing to a non-removable, magnetic disk storage device of an internal hard drive. Alternatively, storage system 514 is a semiconductor storage device such as ROM, EPROM, flash memory or any other computer-readable tangible storage media that can store a computer program and digital information. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical device can be provided. In such instances, each can be connected to bus 508 by one or more data storage interfaces. As will be further depicted and described below, memory 506 may include at least one program product having a set (e.g., at least one) of program modules that are configured to carry out the functions of embodiments of the present invention.

Program code embodied on a computer-readable storage medium may be transmitted using any appropriate medium including, but not limited to, wireless, wireline, optical fiber cable, radio-frequency (RF), etc., or any suitable combination of the foregoing.

Program 516, having a set (at least one) of program modules 518, may be stored in memory 506 by way of example, and not limitation, as well as an operating system, one or more application programs, other program modules, and program data. Program 516 may be any set of instructions operating on a computer system, such as smart index creator 132. Each of the operating systems, one or more application programs, other program modules, and program data or some combination thereof, may include an implementation of a networking environment. Program modules 518 may carry out the functions and/or methodologies of embodiments of the present invention as described herein.

Computer system 502 may also communicate with one or more external devices 520 (such as a keyboard, a pointing device, a display 522, etc.), one or more devices that enable a user/consumer to interact with computer system 502, and/or any devices (e.g., network card, modem, etc.) that enable computer system 502 to communicate with one or more other computing devices. Such communication can occur via I/O interfaces 524. Computer system 502 can also communicate with one or more networks such as a local area network (LAN), a general wide area network (WAN), and/or a public network (e.g., the Internet) via network adapter 526. As depicted, network adapter 526 communicates with the other components of computer system 502 via bus 508. It should be understood that although not shown, other hardware and/or computer software components could be used in conjunction with computer system 502. Examples include, but are not limited to: microcode, device drivers, redundant processing units, external disk drive arrays, RAID systems, tape drives, and data archival storage systems, etc.

Smart index creation functionality 132 and index reconciliation and attachment module 130 can be written in various programming languages (such as Java, C++) including low-level, high-level, object-oriented or non object-oriented languages. Alternatively, the functions of smart index creation functionality 132 and index reconciliation and attachment module 130 can be implemented in whole or in part by computer circuits and other hardware (not shown).

Based on the foregoing, a computer system, method, and program product have been disclosed for creating and reconciling an index for efficient query plan execution. However, numerous modifications and substitutions can be made without deviating from the scope of the present invention. In this regard, each block in the flowcharts or block diagrams may represent a module, segment, or portion of code, which comprises one or more executable instructions for implementing the specified logical functions(s). It should also be noted that, in some alternative implementations, the functions noted in the block may occur out of the order noted in the figures. Therefore, the present invention has been disclosed by way of example and not limitation.

What is claimed is:

1. A method for forming an index to access a database table, the method comprising the steps of:
   a first server computer determining access performance and workload of at least some of a database, and in response, determining a recommendation for an index to a database table stored on the first server computer;
   the first server computer sending the recommendation for the index to a second server computer, wherein the second server computer maintains a previous version of the database table;
   the second server computer creating the recommended index using the previous version of the database table;
   the first server computer receiving the recommended index from the second server computer;
   the first server computer modifying the recommended index based on one or more differences between the database table stored on the first server computer and the previous version of the database table stored on the second server computer; and
   the first server computer subsequently using the index to access an entry in the database table.

2. The method of claim 1, further comprising the step of, before the step of using the index to access an entry in the database table, the first server computer determining an access plan, based in part on the index, for accessing entries in the database table.

3. The method of claim 1, further comprising the step of, before the step of receiving the recommended index from the second server computer, the first server computer replicating the database table to the second server computer.

4. The method of claim 1, further comprising the step of the first server computer receiving from the second server computer a timestamp corresponding to the most recent change of the previous version of the database table on the second server computer.

5. The method of claim 4, wherein the step of modifying the recommended index based on changes to the database table made after the previous version comprises:
   the first server computer scanning a database log corresponding to the database table, the database log keeping a record of all changes made to the database table;
   the first server computer noting the changes to the database table occurring after the received timestamp; and
   the first server computer adding the noted changes to the recommended index.

6. The method of claim 1, wherein the step of the second server computer creating the recommended index using the previous version of the database occurs in parallel with processes executing on the first server computer.

7. A computer system for forming an index to access a database, the computer system comprising:
   a processor;
   a tangible, computer-readable memory for storing program instructions which when executed by the processor perform the steps of:
   determining access performance and workload of at least some of a database, and in response, determining a recommendation for the index to a database table
   sending the recommendation for the index from a first server computer to a second server computer, wherein the second server computer maintains a previous version of the database table;
   receiving the recommended index at the first server computer from the second server computer;
   modifying the recommended index based on one or more differences between the database table stored on the first server computer and the previous version of the database table stored on the second server computer; and
   subsequently using the index to access an entry in the database table.

8. The computer system of claim 7, wherein the product instructions when executed by the processor perform the further step of:
   replicating the database table from the first server computer to the second server computer.

9. The computer system of claim 7, wherein the product instructions when executed by the processor perform the further step of:
building the recommended index on the second server computer, based on the recommendation for the recommended index and the previous version of the database table, on the second server computer, of the database table.

10. The computer system of claim 7, wherein the product instructions when executed by the processor perform the further step of:
determining an access plan, based in part on the index, for accessing the entry in the database table.

11. The computer system of claim 7, wherein the product instructions when executed by the processor perform the further step of:
scanning a database log on the second server computer corresponding to the previous version of the database table for a timestamp of the most recent change to the previous version of the database table.

12. The computer system of claim 11, wherein the product instructions when executed by the processor perform the further step of:
receiving at the first server computer the timestamp from the second server computer.

13. The computer system of claim 12, wherein the program instructions, which when executed by the processor perform the step of modifying the recommended index based on changes to the database table made after the previous version of the database table, perform the steps of:
scanning a database log corresponding to the database table on the first server computer, the database log keeping a record of all changes made to the database table;
noting the changes to the database table occurring after the received timestamp; and
adding the changes to the database table occurring after the received timestamp to the recommended index.

14. A computer program product for forming an index to access a database, the computer program product comprising:
a tangible, computer-readable memory for storing program instructions which when executed by a processor perform the steps of:
determining access performance and workload of at least some of a database, and in response, determining a recommendation for the index to a database table
sending the recommendation for the index from a first server computer to a second server computer, wherein the second server computer maintains a previous version of the database table;
receiving the recommended index at the first server computer from the second server computer;
modifying the recommended index based on one or more differences between the database table stored on the first server computer and the previous version of the database table stored on the second server computer; and
subsequently using the index to access an entry in the database table.

15. The computer program product of claim 14, wherein the program instructions, stored on the tangible, computer-readable memory, are downloaded over a network to a remote data processing system for use in a computer-readable memory in the remote data processing system.

16. The computer program product of claim 15, wherein the product instructions when executed by the processor perform the further step of replicating the database table from the first server computer to the second server computer.

17. The computer program product of claim 15, wherein the product instructions when executed by the processor perform the further step of building the recommended index on the second server computer, based on the recommendation for the recommended index and the previous version of the database table, on the second server computer, of the database table.

18. The computer program product of claim 15, wherein the product instructions when executed by the processor perform the further step of determining an access plan, based in part on the recommended index, for accessing the entry in the database table.

19. The computer program product of claim 15, wherein the product instructions when executed by the processor perform the further step of scanning a database log on the second server computer corresponding to the previous version of the database table for a timestamp of the most recent change to the previous version of the database table.

20. The computer program product of claim 19, wherein the product instructions when executed by the processor perform the further step of receiving at the first server computer the timestamp from the second server computer.

21. The computer program product of claim 20, wherein the program instructions, which when executed by the processor perform the step of modifying the index, perform the steps of:
scanning a database log corresponding to the database table on the first server computer, the database log keeping a record of all changes made to the database table;
noting the changes to the database table occurring after the received timestamp; and
adding the changes to the database table occurring after the received timestamp to the recommended index.

* * * * *